United States Patent
Schreiber

[11] 3,868,167
[45] Feb. 25, 1975

[54] ELECTRO-OPTICAL COMMUNICATION OF VISUAL IMAGES

[75] Inventor: William F. Schreiber, Cambridge, Mass.

[73] Assignee: Massachusetts Institute of Technology, Cambridge, Mass.

[22] Filed: Jan. 15, 1973

[21] Appl. No.: 323,757

[52] U.S. Cl. .................... 350/7, 350/285, 178/7.6
[51] Int. Cl. ........................................ G02b 17/00
[58] Field of Search ............. 350/6, 7, 285; 178/7.6

[56] References Cited
UNITED STATES PATENTS

| | | | |
|---|---|---|---|
| 1,725,710 | 8/1929 | Hammond | 350/6 UX |
| 3,139,604 | 6/1964 | Meiners et al. | 350/6 X |
| 3,619,039 | 11/1971 | Beiser | 350/7 |
| 3,675,016 | 7/1972 | Blaisdell | 350/7 |
| 3,704,949 | 12/1972 | Thomas | 350/285 |

Primary Examiner—Ronald L. Wibert
Assistant Examiner—Michael J. Tokar
Attorney, Agent, or Firm—Arthur A. Smith, Jr.; Martin M. Santa; Robert E. Hillman

[57] ABSTRACT

In optical scanning apparatus useful, e.g., for high speed digital communication of photographic images, a light source is arranged to produce a beam incident on a rotatable reflector along a path forming an acute angle with the scanning surface defined by the sweep of the reflected beam, and the scanning axis about which the reflector rotates is tilted with respect to the surface of the reflector and toward the scanning surface from the side thereof on which the beam is incident on the reflector, the axis thereby forming an acute angle with the scanning surface, the arrangement producing a desired approximation of planarity of the scanning surface.

12 Claims, 4 Drawing Figures

ELECTRO-OPTICAL COMMUNICATION OF VISUAL IMAGES

BACKGROUND OF THE INVENTION

This invention relates to optical scanning, useful, e.g., for high speed digital communication of photographic images.

Typically the scanning optics involved in transmission or reception of photographic images include a mirror which is rotated to sweep through an angle the light beam (e.g., from a laser) reflected by the mirror. A lens focuses the sweeping beam onto the object to be scanned.

SUMMARY OF THE INVENTION

The invention can be embodied in both transmitter and receiver, and makes possible very compact apparatus which is reliable, simple to adjust and operate, has few moving parts and produces high quality communication, at low cost. In particular, excellent image quality can be maintained even where the scanning beam sweeps through very large angles (e.g., 60°).

In general the invention features a light source arranged to produce a beam incident on a rotatable reflector along a path forming an acute angle with the scanning surface defined by the sweep of the reflected beam, and the scanning axis about which the reflector rotates is tilted with respect to the surface of the reflector and toward the scanning surface from the side thereof on which the beam is incident on the reflector, the axis thereby forming an acute angle with the scanning surface, the arrangement producing a desired approximation of planarity of the scanning surface.

In preferred embodiments the axis is tilted with respect to the reflector surface by the same acute angle formed by the incident beam and the scanning surface, preferably less than 30°; light incident upon and reflected from the reflector passes through the same focusing lens in opposite directions; a folding mirror interposed between the reflector and the field to be scanned increases the compactness of the device; the light source is a laser having its axis parallel to the scanning surface, a plurality of mirrors are arranged to reflect light from the laser in a plane parallel to the scanning surface and including the axis of the laser, a further mirror is arranged to receive light from the last of the plurality of mirrors and reflect it out of the plane, and a final mirror is arranged to receive light from the further mirror and reflect it to the reflector; and a beam expansion lens is used upstream of the focusing lens.

Other advantages and features of the invention will be apparent from the description and drawings herein of a preferred embodiment thereof.

DESCRIPTION OF THE PREFERRED EMBODIMENT

Figure 1:
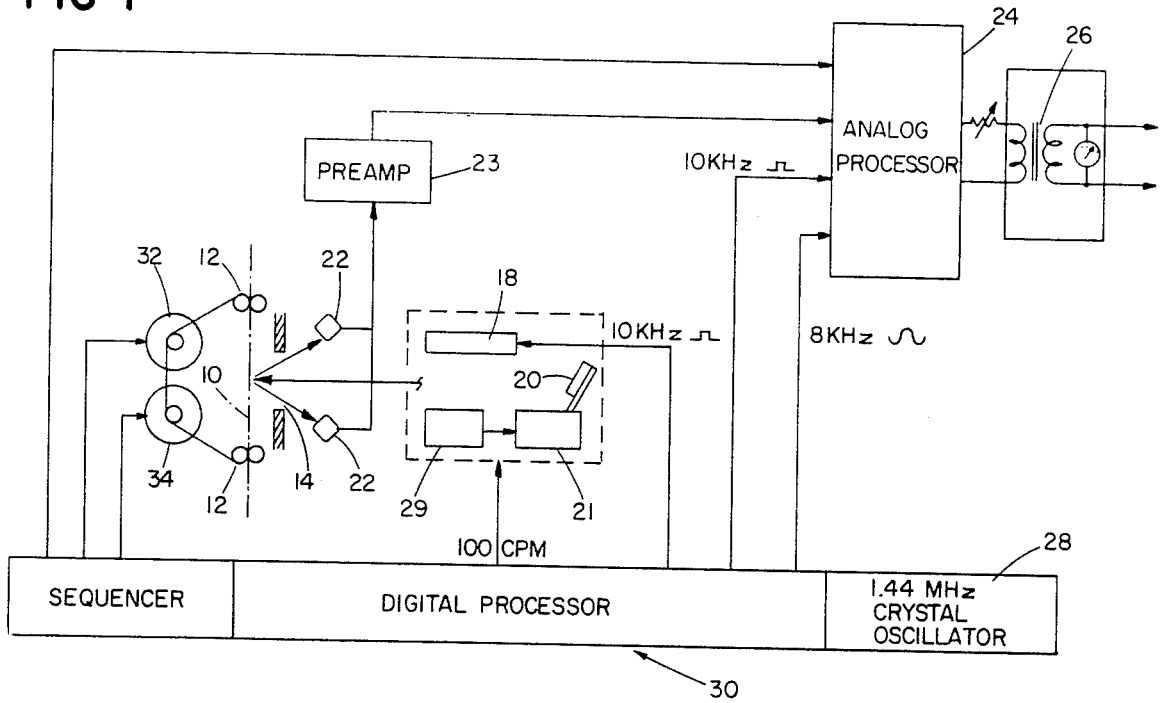
FIG. 1 is a schematic diagram of an image transmitter, showing fragments of the optical system.
Figure 2:
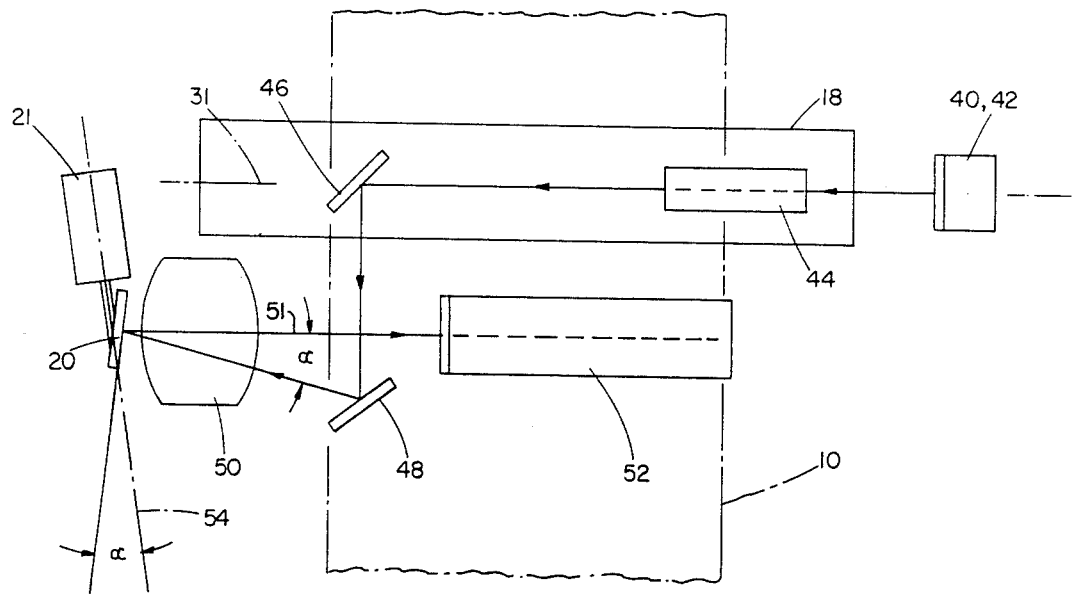
FIG. 2 is a schematic elevation of the complete optical system of the transmitter of FIG. 1.
Figure 3:
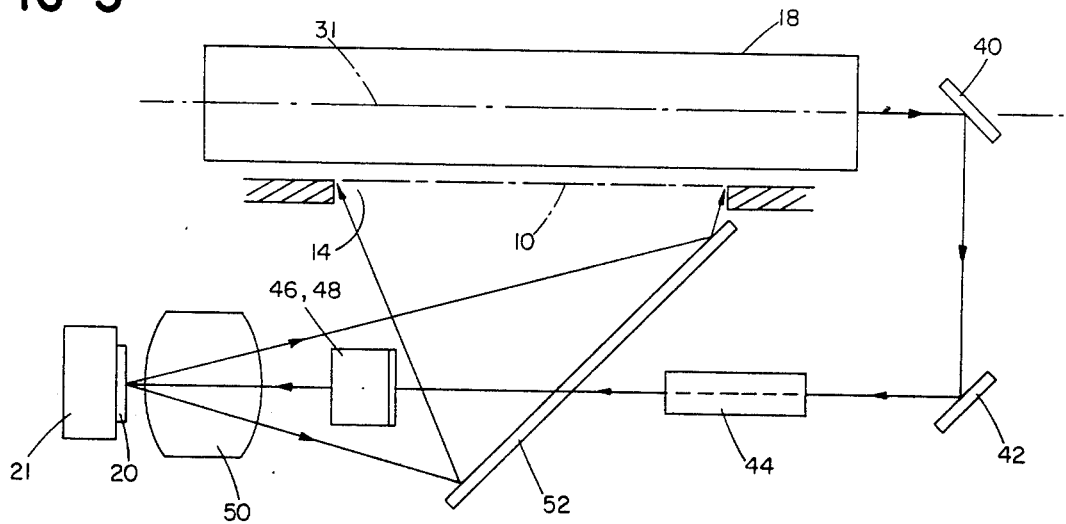
FIG. 3 is a top view corresponding to FIG. 2.

A transmitter for producing and handling video signals from, e.g., a photograph or business document and for obtaining an amplitude modulated 2,000 cycle carrier for transmission of the image is shown in FIGS. 1-3.

The subject photograph 10 is guided for vertical movement through motor driven rolls 12 past a scanning field defined by aperture 14. A laser (helium neon) 18 is modulated from full brightness to cutoff using a 10 KHz square wave. The laser beam is projected through an optical system onto the photograph. One of the elements in the optical system is a mirror 20 driven by galvanometer 21 which causes the beam to scan a standard line 11 ½ inches long at right angles to the direction of paper motion past aperture 14. The reflected light is picked up by an array of solar cells 22 which feed their output current in parallel to a preamplifier 23 where the current is amplified and bandlimited 8 to 12 KHz. Since this picture signal modulates a 10 KHz carrier, the preamplifier is immune from the effects of room light or DC drift.

The preamplifier output at a level high enough to avoid contamination by noise goes to an analog processing circuit 24 where the 10 KHz video signal is multiplied by an 8 KHz sinewave using an integrated circuit precision multiplier. The output of the multiplier is filtered to give a 2 KHz double sideband modulated signal which is then amplified and coupled by a transformer 26 to the telephone line.

The 10 KHz square wave and 8 KHz sinewave are both derived from an accurate crystal oscillator 28 operated at 1.44 MHz. The clock is also counted down to a 100 PPM pulse which is used to synchronize the sweep generator 29 which deflects the galvanometer driven mirror. The clock is part of the digital circuitry 30 which also implements the start and stop routine. Upon start-up, an unmodulated 10 KHz reference signal is provided to the multiplier in place of the 10 KHz amplitude modulated signal from the photodetection circuit. The transmitter output is thus a precise 0dbm 2 KHz lineup tone. After 30 seconds the lineup tone is interrupted twice by −32 db blanking pulses. The latter occur at 100 pulses per minute in synchronism with the galvanometer sweep retrace interval. After these two pulses, the multiplier input is switched to the photosignal, and a modulated output corresponding to the picture is transmitted over the line. Precise −32 db blanking pulses continue to occur during sweep retrace.

Paper sensors (not shown) are provided just above and below the scanning aperture. When the picture is inserted into the paper guide, and the start button is pushed, a high speed motor 32 moves the picture down until it is at the scanning aperture. After the line-up tone is finished either at the end of 30 seconds or when the early line-up button is pushed, a slower speed motor 34 is turned on and the paper is moved past the scanning aperture at the rate of 1 inch per minute. When the trailing edge of the picture is a short distance above the scanning aperture, one of the paper sensors detects this condition, shuts down the transmission, turns off the slow speed motor and turns on the high speed motor long enough to flush the paper out of the paper guide.

Referring more particularly to the optical system, the axis 31 of laser 18 extends horizontally, parallel to the plane of aperture 14. The laser beam is reflected twice at right angles in the horizontal plane by mirrors 40 and 42, passes horizontally through beam expansion lens 44 to mirror 46 which reflects it vertically down to mirror 48, and is reflected by mirror 48 obliquely up at an acute angle (e.g. 15°, and preferrably less than 30°) α to the horizontal into focusing lens 50 (flat field camera type, e.g. with a 3 inch aperture and f/3.5). Lens 50 collimates the light (and is aided in this function by the expansion lens) for incidence upon scanning mirror 20. Mirror 20 is tilted so that the beam it reflects will return horizontally through lens 50 and will be reflected by folding mirror 52 to aperture 14. As mirror 20 is oscillated about its scanning axis of rotation 54, the locus of positions of the beam it reflects approximates a horizontal plane, and as the beam thus sweeps over that approximately planar scanning surface 51 and is folded by mirror 52, it scans horizontally across aperture 14.

Scanning axis 54 is tilted out of the plane of mirror 20 toward the scanning surface 51 from the side thereof on which the beam is incident on mirror 20, the axis thus making an acute angle with the scanning surface. By controlling the angle between mirror 20 and axis 54 the scanning surface can be caused to approximate a plane with a high degree of accuracy, as is important if the scanned line across aperture 14 is to be straight. (Were axis 54 to lie in the plane of the mirror, or parallel thereto, the scanned line would be hyperbolic, drooping at its ends.) In particular, a feature of the invention is that if mirror 20 makes an angle with its scanning axis equal to α, the scan line will be straight within measurable tolerances, even for very wide angle oscillation of mirror 20. Thus, e.g., mirror 20 may be oscillated through 30°, giving a 60° oscillation of the beam it reflects, and enabling the scan of a wide photograph even with mirror 52 relatively close to aperture 14. The ability for wide angle scanning without loss of accuracy, supplemented by the folding effect of mirror 52, and by the rest of the optical system, provides an extremely compact device.

By keeping the beam parallel to either the horizontal or vertical major axes of the system until it leaves mirror 48, adjustment of the mirrors 40, 42, 46 is simplified, and the assembly made more rugged, since each such mirror requires only one degree of freedom.

Figure 4:
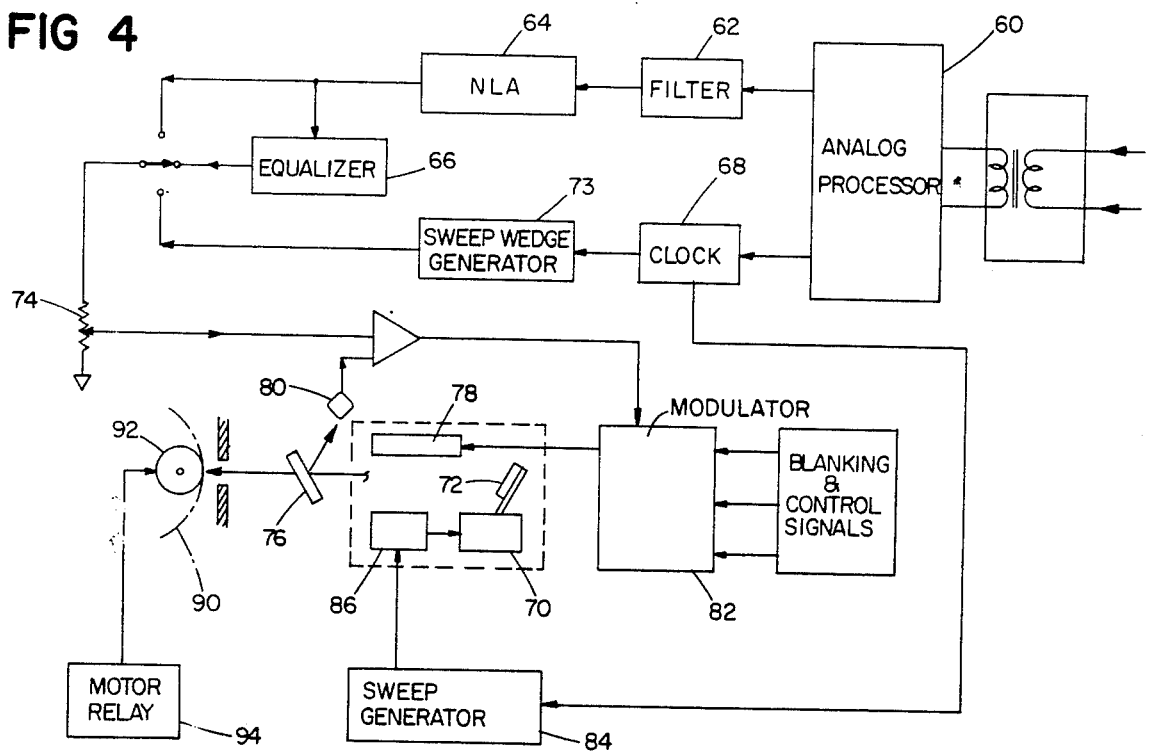
FIG. 4 is a schematic diagram, similar to FIG. 1, of a receiver for use with the transmitter of FIGS. 1-3.

FIG. 4 illustrates a receiver embodying the same optical configuration described above and thus not shown again.

The signal received from the line is transformer coupled into analog processor 60. Here it is amplified and rectified. The additional operations of signal detection, voice immunity, automatic gain control, and dropout at the end of transmission are also accomplished in the analog processor. The output of the processor is a fullwave rectified signal which then passes through a filter 62 which removes the 4kc and higher components leaving only the baseband signal. This is then fed to a nonlinear amplifier 64 which is a dc amplifier having a characteristic in which the output voltage corresponding to any level of input signal is proportional to the amount of light required to expose the dry silver paper used in the receiver, eventually developing exactly the right density. The required characteristic of the nonlinear amplifier is derived by carefully measuring the D log E curve of the paper with the conditions of processing used. Then one works backwards from this to find the relationship between the light required to achieve a certain density on the paper and the signal which results at the transmitter from scanning that particular density. The output of the nonlinear amplifier goes to an equalizer 66 which is a filter with high frequency emphasis. It recovers some of the high frequency power lost in the transmitter and receiver scanning apertures as well as the telephone line. Additional equalization can be used to crispen the picture somewhat above what would be achieved by a "flat" rendition of the frequencies in the original picture. The analog processor circuit also produces a phasing pulse at the end of the lineup tone. This pulse synchronizes a clock 68 which is a digital counter counting down from a 1.44 MHz crystal oscillator. The clock produces 100 PPM pulses which are used to drive the galvanometer 70 which oscillates scanning mirror 72. For calibration purposes the clock also produces timing signals which are used by generator 73 to generate a 14 step wedge which is automatically keyed in after the picture is detected and before the end of the lineup tone. Thus each received picture has a wedge on it which can be used to judge the correctness of the laser modulation and the heat processing of the paper.

The selected video goes to a potentiometer 74. The light falling on the paper is directly proportional to the video signal multiplied by the setting of potentiometer 74.

In order to get the light on the paper exactly proportional to the video signal, light feedback is used. A beam splitter 76 takes about 6 percent of the light coming out of laser 78, for detection with a solar cell 80 and amplification. This signal is compared with the input video and the difference is used to drive the laser modulator 82. Since the loop gain is fairly high this guarantees that the feedback signal is essentially equal to the video signal. The modulator also has, as inputs, blanking and control signals from the clock and analog processor. These serve the purpose of keeping the laser off except when a picture is being received. The beam is also blanked during mirror retrace and automatically the step wedge is keyed in before the picture starts.

The 100 PPM pulses go to sweep generator 84 where a sawtooth voltage is produced. This in turn goes to deflection amplifier 86 to produce a proportional current. The current drives the galvanometer 70.

The modulated beam is caused to scan dry silver photosensitive paper 90, which is motor driven over roller 92 under control of motor relay 94.

Other embodiments (e.g., in which the scanning mirror axis does not intersect the scanning mirror, etc.) are within the following claims.

What is claimed is:

1. In transmitting or receiving apparatus for use in electro-optical communication of visual images such as photographs, documents, or the like, said apparatus including a light source, circuitry for carrying electric signals corresponding to the modulation of said light source, means defining a field to be scanned, and an optical system for causing a light beam from said source to focus upon and scan said field, said optical system including a substantially flat reflector movable about a scanning axis to effect said scanning, the focus of beam positions of light reflected from said reflector upon movement about said axis defining a scanning surface having an intersection with said field to define a scan line, that improvement comprising arrangement of said source and said optical system so that said light beam is incident upon said reflector along a path forming an acute angle with said scanning surface, and arrangement of said reflector and said means defining said field so that said axis is tilted with respect to the surface of said reflector and toward said scanning surface from the side thereof on which said beam is incident upon said reflector, said axis being so tilted at an angle relative to said reflector surface substantially equal to said acute angle, said axis thereby forming an angle of less than 90° with said scanning surface, said arrangement producing a predetermined approximation of planarity of said scanning surface and a corresponding predetermined approximation of straightness of said scan line independent of the angle through which said reflector is moved about said scanning axis.

2. The improvement of claim 1 wherein said light source is a laser.

3. The improvement of claim 1 further comprising a focusing lens arranged adjacent said reflector and in the path of light from said reflector to said field, for passage therethrough of light incident on and reflected from said reflector.

4. The improvement of claim 1 further comprising a folding mirror arranged for incidence thereupon of light from said reflector and reflection of said light through an angle to said field.

5. The improvement of claim 4 wherein said light source is a laser having its axis parallel to said scanning surface, a plurality of mirrors are arranged to reflect light from said laser in a plane parallel to said scanning surface and including said axis of said laser, a further mirror is arranged to receive light from the last of said plurality of mirrors and reflect it out of said plane, and a final mirror is arranged to receive light from said further mirror and reflect it to said reflector.

6. The improvement of claim 5 further comprising a beam expansion lens just upstream of said further mirror, and a focusing lens adjacent said reflector for passage therethrough of light incident on and reflected from said reflector.

7. The improvement of claim 1 wherein said acute angle is less than 30°.

8. The improvement of claim 1 wherein said reflector is arranged for rotation about said scanning axis through at least 30°, thereby producing a scan over said field of at least 60°.

9. The improvement of claim 1 wherein said field at said scan line is transverse to said scanning surface.

10. The improvement of claim 9 wherein said field at said scan line is perpendicular to said scanning surface.

11. The improvement of claim 1 wherein said scan line is substantially linear.

12. The improvement of claim 1 further comprising a focusing lens between said reflector and said field, for passage therethrough of light reflected from said reflector.

* * * * *